(12) United States Patent
Routt et al.

(10) Patent No.: US 12,206,702 B2
(45) Date of Patent: Jan. 21, 2025

(54) POST-QUANTUM-RESISTANT CRYPTOGRAPHIC SYSTEM AND METHODS

(71) Applicants: AT&T Intellectual Property I, L.P., Atlanta, GA (US); AT&T Mobility II LLC, Atlanta, GA (US)

(72) Inventors: Thomas J. Routt, Sequim, WA (US); Mark Stockert, San Antonio, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 83 days.

(21) Appl. No.: 18/181,324

(22) Filed: Mar. 9, 2023

(65) Prior Publication Data

US 2024/0305663 A1    Sep. 12, 2024

(51) Int. Cl.
*H04L 9/40*         (2022.01)
(52) U.S. Cl.
CPC ...... *H04L 63/1441* (2013.01); *H04L 63/1416* (2013.01)
(58) Field of Classification Search
None
See application file for complete search history.

(56) References Cited

U.S. PATENT DOCUMENTS

| 8,190,553 | B2  |   | 5/2012 | Routt      |           |
|-----------|-----|---|--------|------------|-----------|
| 11,366,897| B1  | * | 6/2022 | Ramanathan | H04L 9/3263 |
| 2012/0017262 | A1 | * | 1/2012 | Kapoor  | H04L 67/63 726/1 |
| 2021/0312047 | A1 | * | 10/2021 | Chen    | H04L 9/0858 |
| 2023/0308458 | A1 | * | 9/2023 | Varsanyi | H04L 63/1408 |
| 2023/0412626 | A1 | * | 12/2023 | Wright  | H04L 41/16 |

OTHER PUBLICATIONS

Dubrova, et al., "Breaking a Fifth-Order Masked Implementation of CRYSTALS-Kyber by Copy-Paste", Royal Institute of Technology, Stockholm, Sweden, 2022, 22pgs.

* cited by examiner

*Primary Examiner* — Christopher C Harris
(74) *Attorney, Agent, or Firm* — GUNTIN & GUST, PLC; Robert Gingher

(57) ABSTRACT

Aspects of the subject disclosure may include, for example, a device that has a processing system including a processor; and a memory that stores executable instructions that, when executed by the processing system, facilitate performance of operations of performing a packet analysis of protocol data unit (PDU) headers of inbound Internet and non-Internet traffic; determining whether the PDU headers identify the presence of a quantum payload and/or via deep packet inspection; detecting a presence of attack vectors in the quantum payload responsive to a determination that the PDU headers identify the presence of the quantum payload, wherein the attack vectors originate from a quantum computer, and wherein the attack vectors are cryptanalytically relevant; generating an alert responsive to detecting the presence of the attack vectors; and isolating compromised network elements, sets of elements, and/or other network components and/or subsystems, and route traffic around the compromised network elements, sets of elements, and/or other network components and/or subsystems. Other embodiments are disclosed.

20 Claims, 11 Drawing Sheets

| NIST-Selected Initial Group of Post-Quantum Cryptography Algorithms – July 5, 2022 | | |
|---|---|---|
| Category | Algorithm | Description |
| General Encryption | CRYSTALS-KYBER | IND-CCA2-secure key encapsulation mechanism (KEM) with security based on the difficulty of solving the learning-with-errors (LWE) problem over algebraic module lattices. Based on LWE-based encryption scheme of Regev where the secret can be incorporated into the same distribution as the notice, where the LWE scheme can be built using a square rather than rectangular matrix as the public key. Kyber-768 security is roughly equivalent to AES-192; Kyber-1024 is roughly equivalent to AES-256. |
| Digital Encryption | CRYSTALS-Dilithium | Digital signature scheme that is secure under chosen message attacks based on the difficulty of lattice problems over lattice matrices, where adversaries with access to a signing oracle cannot apparently produce a signature of a message whose message has not yet been seen, nor produce a different signature of a message that has previously been seen. Dilithium-3 parameter set is recommended which achieves greater than 128 bits of security against known classical and quantum attacks. Design is based on the 'Fiat-Shamir with Aborts' technique of Lyubashevsky which uses rejection sampling to create lattice-based Fiat-Shamir schemes |
| | FALCON | Gaussian sampler cryptographic signature algorithm based on the theoretical framework of Gentry, Peikert and Vaikuntanathan for lattice-based signature schemes where the framework is instantiated over NTRU lattices with a trapdoor sampler called 'Fast Fourier Sampling'. The underlying hard problem is the short integer solution (SIS) problem. |
| | SPINCS+ | Stateless hash-based signature scheme specifically directed to reducing signature size, includes SHAKE256, SHA-256, Haraka. |

| Classical Cryptographic Algorithm | Type | Purpose | Projected Impact from CRQC Attack |
|---|---|---|---|
| AES-128, AES-256, FPGA AES-512 | Symmetric Key | Encryption | Larger key sizes needed for AES-128, AES-256, 512-bit keys to follow |
| SHA-3, SHA-256 | | Hash functions | Larger key sizes needed |
| RSA | Public Key | Digital Signature (DS), key establishment | No longer secure |
| ECDSA, ECDH (Elliptic Curve) | Public Key | DS, key establishment | No longer secure |
| DSA (Finite Field) | Public Key | DS, key establishment | No longer secure |

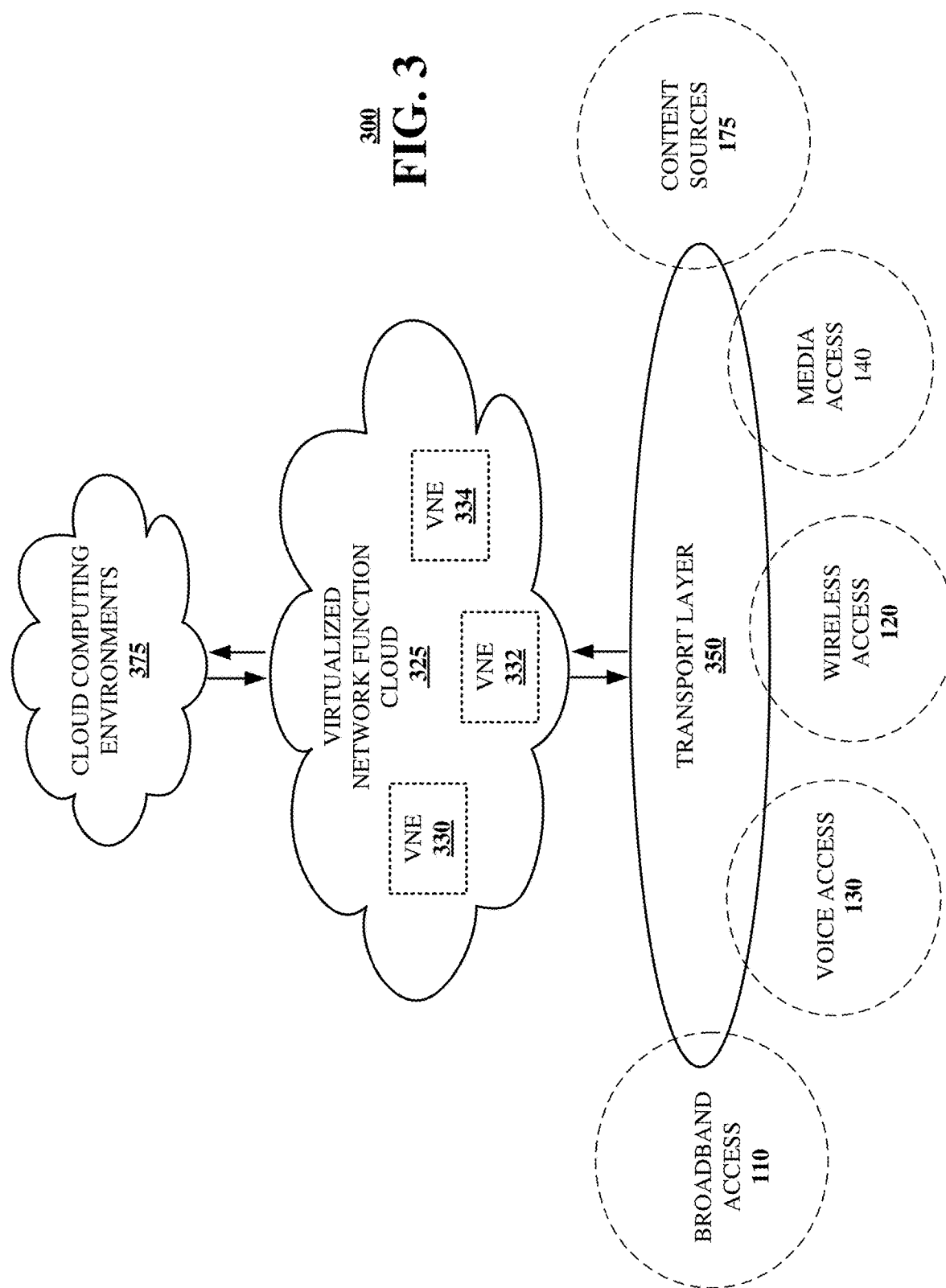

POST-QUANTUM-RESISTANT CRYPTOGRAPHIC SYSTEM AND METHODS

FIELD OF THE DISCLOSURE

The subject disclosure relates to a post-quantum resistant cryptographic system and methods.

BACKGROUND

Digital and physical assets are increasingly compromised both in cyberspace and across critical infrastructure platforms. Cyberattacks continue to increase in scope, scale, sophistication, and cost. Secure data-in-transit and data-at-rest are of paramount importance to individuals, enterprises, and governments in the connected digital world, especially in the hyper-connected Internet of Things (IoT) era.

Capabilities to compromise encryption keys within classical (non-quantum) cryptosystems, based on for example, factoring increasingly large primes from ever-larger integers within the keys of classical public cryptosystems in tractable time is accelerating. In addition, a progression in quantum computing R&D in recent years is rapidly increasing the threat of compromise to classical (non-quantum) public-key cryptosystems from quantum computers.

BRIEF DESCRIPTION OF THE DRAWINGS

Reference will now be made to the accompanying drawings, which are not necessarily drawn to scale, and wherein:

FIG. 2A is a table summarizing National Institute of Standards and Technology-selected classical general encryption and digital encryption structured lattice algorithms directed to public-key encryption/key-establishment mechanism.

FIG. 2B is a table that projects the impact of a cryptanalytically relevant quantum computer attack on representative conventional (classical, non-quantum) cryptographic algorithms.

FIG. 3 is a block diagram illustrating an example, non-limiting embodiment of a virtualized communication network in accordance with various aspects described herein.

DETAILED DESCRIPTION

Figure 1:
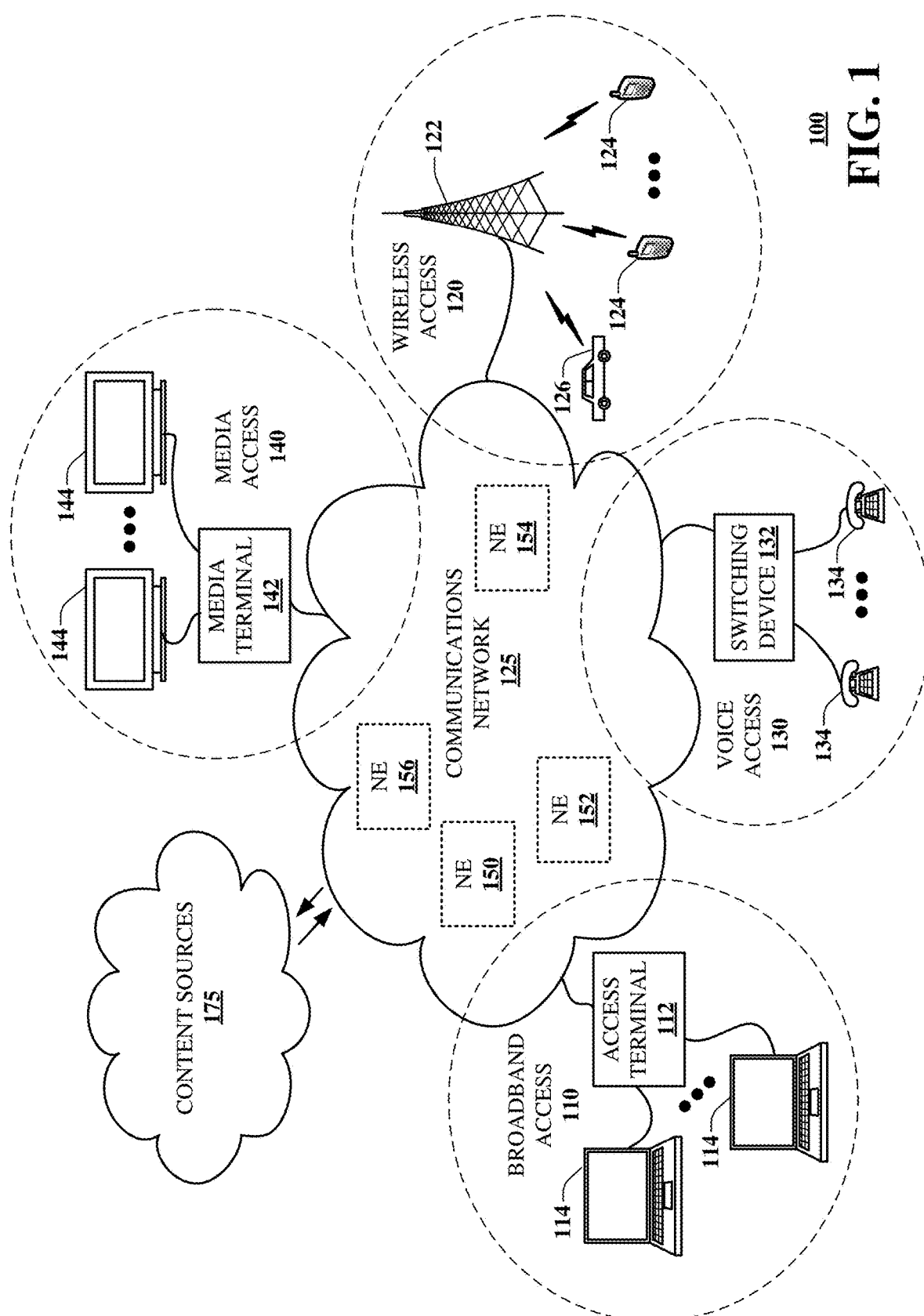
FIG. 1 is a block diagram illustrating an exemplary, non-limiting embodiment of a communications network in accordance with various aspects described herein.

The subject disclosure describes, among other things, illustrative embodiments for system and methods to provide Quantum-Resistant Cryptography and Post-Quantum Cryptosystems against projected cryptanalytically relevant quantum computer (CRQC) platforms. Other embodiments are described in the subject disclosure.

One or more aspects of the subject disclosure include a device that has a processing system including a processor; and a memory that stores executable instructions that, when executed by the processing system, facilitate performance of operations of performing a packet analysis of protocol data unit (PDU) headers of inbound Internet and/or non-Internet traffic; determining whether the PDU headers identify the presence of a quantum payload; detecting a presence of attack vectors in the quantum payload responsive to a determination that the PDU headers and/or deep packet inspection identify the presence of the quantum payload, wherein the attack vectors originate from a quantum computer, and wherein the attack vectors are cryptanalytically relevant; generating an alert responsive to detecting the presence of the attack vectors; and isolating compromised network elements, sets of elements, and/or other network components and/or subsystems, and route traffic around the compromised network elements, sets of elements, and/or other network components and/or subsystems.

One or more aspects of the subject disclosure include a machine-readable medium, comprising executable instructions that, when executed by a processing system including a processor, facilitate performance of operations including: determining whether protocol data unit (PDU) headers received from Internet and/or non-Internet traffic comprise reference to a quantum payload; detecting a presence of attack vectors in the quantum payload responsive to a determination that the PDU headers identify reference to the quantum payload and/or via deep packet inspection, wherein the attack vectors originate from a quantum computer, and wherein the attack vectors are cryptanalytically relevant; and generating an alert responsive to detecting the presence of the attack vectors.

One or more aspects of the subject disclosure include a method of receiving, by a processing system including a processor, Internet and/or non-Internet traffic; determining, by the processing system, whether protocol data unit (PDU) headers of packets in the Internet traffic identify reference to a quantum payload, wherein the determining performs an analysis of the packets; detecting, by the processing system, a presence of attack vectors in the quantum payload responsive to a determination that the PDU headers identify reference to the quantum payload and/or via deep packet inspection, wherein the attack vectors originate from a quantum computer and are cryptanalytically relevant, wherein the attack vectors comprise patterns, and wherein the patterns are one or more of handshake, connection establishment, data transfer, retransmission, quantum error correction, and quantum error avoidance; reporting, by the processing system, an alert responsive to detecting the presence of the attack vectors; and isolating compromised network elements, sets of elements, and/or other network components and/or subsystems, and route traffic around the compromised network elements, sets of elements, and/or other network components and/or subsystems.

One or more embodiments of the subject disclosure include a method of a processing system using artificial intelligence reinforcement to detect unique attack 'fingerprints' or 'signatures'—to include detection of AI-based deep learning analysis to side-channel attacks—and, if an attack is detected, quantum federal reinforcement learning agents isolate compromised network elements, sets of elements, and/or other network components and/or subsystems, and route traffic around the compromised network elements, sets of elements, and/or other network components and/or subsystems.

Referring now to FIG. 1, a block diagram is shown illustrating an example, non-limiting embodiment of a system 100 in accordance with various aspects described herein. For example, system 100 can facilitate in whole or in part determining whether protocol data unit (PDU) headers received from Internet and/or non-Internet traffic identify reference to a quantum payload and/or via deep packet inspection; detecting a presence of attack vectors in the quantum payload responsive to a determination that the PDU headers identify reference to a quantum payload; and generating an alert responsive to detecting the presence of the attack vectors. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Digital and physical assets are increasingly compromised both in cyberspace and across critical infrastructure platforms. Cyberattacks continue to increase in scope, scale, sophistication, and cost. Secure data-in-transit and data-at-rest are of paramount importance to individuals, enterprises, and governments in the connected digital world, especially in the hyper-connected Internet of Things (IoT) era.

Cybersecurity breaches have more than doubled within the past few years. Incidents that were once considered extraordinary are becoming increasingly commonplace. The financial and national security impacts of cybersecurity breaches have risen dramatically, with some of the largest costs in recent years related to distributed denial of service (DDoS) attacks, ransomware and zero-day exploits. Another growing trend is the use of cyberattacks to target critical infrastructure and strategic industrial/governmental sectors, raising concerns that in a worst-case scenario, perpetrators could trigger a systemic breakdown in the systems that keep societies functioning.

Safe and secure passage, receipt, and processing of enterprise- and mission-critical data relies predominantly on three core cryptographic functions—public key infrastructure, digital signatures, and key exchange. These functions in turn, are generally implemented using Diffie Hellman (DH)

key exchange, the RSA cryptosystem, and elliptic curve cryptosystems, where digital security depends on the difficulty of number-based theoretic problems such as integer factorization or the discrete log problem over various groups.

The Internet is rapidly becoming a vastly bigger space. The 'old' Internet supports approximately 4.3 billion simultaneous connections based on a 32-bit Internet Protocol v4 (IPv4) address space, while the 'new' internet (based on a 128-bit IPv6 address space) theoretically supports up to 340 undecillion (340 trillion-trillion-trillion, 340×1036) addressable, smart, Internet of Things (IoT).

If today's predominantly IPv4-based Internet was the size of a golf ball, the IPv6-expanded IoT could rapidly grow to the size of the sun. Assuming that each atom on earth was assigned one unique IPv6 address, sufficient address space would remain for another 100+ earths.

Hacking and cybercrime, already rampant throughout the 'old' internet, are on track to compromise and disrupt the sensor-based, hyper-connected IoT, including government infrastructure and records, smart grids, water systems, financial networks, global supply chains, transportation systems, connected vehicles, connected homes, wearables, in vivo medical devices, and public safety networks.

Conventional (classical, non-quantum) public key cryptosystems derive their provably secure characteristics as a function of the difficulty in factoring large numbers that are the products of two large prime numbers, where a prime number is an integer greater than 1 if its only divisors are 1 and itself. Breaking large prime algorithms within classical (non-quantum) cryptosystems does not require a brute force attack on every possible key value.

Successful unauthorized penetration of classical cryptosystems generally relies upon brute force attempts to factor a large number, or of taking discrete logarithms in a very large finite field.

Significantly larger primes continue to be calculated on increasingly portable and generally-available classical computer systems, suggesting calculations of multi-magnitude digit enlargement of prime factoring targets, performed on increasing pervasive computing platforms within rapidly diminishing—and therefore increasing polynomial time (i.e., tractable time) intervals.

Compute-intensive evolution of processing platforms and their increasing ubiquity further demonstrate trends toward accelerating improvements in capabilities to compromise encryption keys within classical (non-quantum) cryptosystems, as well as to successfully factor increasing large primes from ever-larger integers within the keys of classical public cryptosystems.

The emergence of quantum computing has ushered in an era where even brute-force hacking of primes, their factors, and all possible classical encryption keys (private or public) is becoming increasingly achievable with rapidly diminishing, non-exponential—and therefore, tractable (polynomial)—time intervals. Furthermore, the difficulty of securely exchanging shared symmetric keys (for example) increases exponentially in direct proportion to the number of participating parties, directly compromising cryptographic functions that otherwise protect network encryption, disk encryption, digital signing, encryption, authentication, smartcards, virtual smartcards, virtual private networks (VPNs), emails, social media, wireless security, anonymity, tokenization, data obscurity/erasure, and cryptocurrencies.

Steady progress in quantum computing R&D in recent years is rapidly increasing the threat to classical, commonly used public-key cryptosystems. Key-establishment schemes and digital signatures based on prime factoring, discrete logarithms and elliptic curve cryptography are projected to be most adversely impacted, whereas symmetric cryptographic primitives (i.e., block ciphers, hash functions) are projected to be only mildly adversely impacted by quantum computing cybersecurity attacks.

FIG. 2A is a table summarizing National Institute of Standards & Technology (NIST) selected classical general encryption and digital encryption structured lattice algorithms directed to public-key encryption/key-establishment mechanism (KEM). On Jul. 5, 2022, NIST selected the first group of four classical (non-quantum) encryption algorithms, completing a six-year competitive effort, illustrated in table 200. NIST stated that these encryption algorithms are designed to withstand the assault of a future cryptanalytically relevant quantum computer (CRQC), constituting the beginning of the finale of the agency's post-quantum cryptography standardization project. Security is achieved as a function of the difficulty of solving mathematical problems over lattices, for example the Closest Vector Problem (CVP) and Shortest Vector Problem (SVP). Lattice-based cryptography and other algorithmic approaches—i.e., Code-based, Multi-variate, Isogeny, Hash-based Cryptography—are intended to run on classical (conventional) computers as Quantum-Safe algorithms to protect data against CRQC attacks.

However, Cryptographic Suite for Algebraic Lattices (CRYSTALS)-KYBER (General Encryption category of FIG. 2A)—IND-CCA2-secure KEM based on the difficulty of solving the learning-with-errors (LWE) problem over algebraic module lattices where the secret can be incorporated into the same distribution as the notice, one of the four NIST-recommended post-quantum cryptography algorithms—was recently exploited by applying AI-based deep learning analysis to side-channel differential analysis, suggesting that deep learning-based side-channel attacks are able to effectively compromise conventional (classical) countermeasures such as shuffling, masking, constant-weight encoding, code polymorphism, random delays insertion, and randomized clock. More particularly, the compromise incorporated a neural network-based recursive learning technique that was found to recover message bits from high-order masked implementations with greater than 99 percent probability. See, e.g., Dubrova, E., et al., "Breaking a Fifth-Order Masked Implementation of CRYSTALS-Kyber by Copy-Paste," KTH Royal Institute of Technology (2022, Stockholm, Sweden), which is incorporated by reference herein.

During 1994, Peter Shor (AT&T Bell Labs) showed that quantum computers—a then pre-emergent technology leveraging physical properties of matter and energy to perform calculations—should one day be able to efficiently solve integer factorization and discrete log problems based on factoring exponentially faster than classical (non-quantum) means. Shor concluded that a future sufficiently powerful quantum computer could someday render many forms of digital communications based on public key cryptosystems inherently vulnerable to security compromise from quantum systems.

During the late 1990's, quantum error correcting codes and threshold theorems were developed that showed that if the error rate per logical operation (quantum gate) in a quantum computer could be reduced below a fixed threshold, then arbitrarily long quantum computations could be carried out in a reliable and fault-tolerant manner by incorporating error-correction steps throughout a quantum computational execution cycle. During the 2000's through 2010's, quantum algorithms achieving exponential and hyper-exponential speedup were developed to address key problems related to quantum search and quantum cryptosystems, simulation of quantum systems, number theory, and topology. See, e.g., Routt, T. J., U.S. Pat. No. 8,190,553, entitled, "Methods and Systems for Quantum Search, Computation and Memory," which is incorporated by reference herein.

Computer and network technologies have rapidly evolved through advances in transistorized electronics and optics, silicon chip computing, and related developments, all driven by exponential improvements in processing power and processor size reduction. However, continuing improvements to conventional (classical, non-quantum) computing appear to have effectively run their course due to limitations associated with transistor component size, proximity, heat dissipation, processing bottlenecks, and operation at molecular— (nanoscale, $10^{-9}$ m), atomic—(ångström/A scale, $10^{-10}$ m), and optoelectronic (picoscale, $10^{-12}$ m) scales.

Moore's law—a tidy relation between increased transistor density and decreased cost per function—is no longer viable. Even Dennard scaling, the behind-the-scenes foundation to multicore processing ensuring steady computer performance gains, is no longer relevant. Data-intensive applications are rapidly eclipsing the ability of classical (non-quantum) computing, storage, networking, and analytics to keep up.

Classical (non-quantum) computers are serial processors that represent bits as either a '0' or a '1' meaning that only a single calculation value can be processed and represented at a given moment, that is, regardless of the number and combination of classical bits, only $2^0=1$ value can be represented at a given time. In contrast, quantum computers are massively parallel processors that employ quantum bits (qubits) which can be in an infinite number of states all at the same time based on a superposition of both '0' and '1' ($2^n$ values). Superposition is an inherent quantum property that enables qubits to exist in all possible states until the state is finally observed and measured to provide a single answer.

Entanglement is another quantum computational property that enables qubit pairs that are proximal or separated over vast distances to remain inextricably state correlated. Two entangled qubits when measured individually can give random results, however when considered as a wholistic system, the states of each set of two entangled qubits are interdependent (their quantum states are no longer separate) with the net result that the overall system contains more information than the sum of the individual parts, a phenomenon which Einstein called 'spooky action at a distance.'

Quantum computing is nothing short of a tectonic shift to a fundamentally new way to directly harness nature. Emerging quantum computers hold the promise of performing massively parallel processing, enabling all processor states and instruction pathways to proceed simultaneously rather than sequentially as in classical computing. Quantum computation has assumed strategic importance due to continuing cost-performance improvements in classical (non-quantum) processor memory, speed, and very large-scale integration (VLSI) substrate density packing are not sustainable due to quantum effects that pervade the scales at which electronic, photonic, and optoelectronic processors, devices, and network components are fabricated and process data.

Quantum computation is also strategically important due to the worldwide quantity of data volume (scale), variety (form, structured/unstructured), velocity (streaming) and veracity (uncertainty) is soaring due to exponential improvements in computing, storage, cloud, and mobility network economies of scale and specialization. While the Internet and World Wide Web have changed how the world communicates, 'Big Data' has transformed how information itself is processed in the following ways:
  Previous reliance upon collecting and using relatively small sample sizes has shifted to emphasis on collecting and storing vast quantities of information in cloud-based data lakes/repositories; and
  Highly curated data need to be generated, often on a just-in-time basis, against exponential increases in available information.

Qubits can be represented as a two-to-n-level quantum system based on electronic/photonic spin and polarization where:
  the state of a qubit is a phase vector $|\psi\rangle$ —mathematical description of a quantum system, a complex-valued probability amplitude, and the probabilities for possible results of measurements made on the system—and is presented in a linear superposition of states such as $|\psi\rangle = \alpha|0\rangle + \beta|1\rangle$;
  state vectors $|0\rangle$ and $|1\rangle$ are physical eigenstates 34 of the logical observable, and form a computational basis state spanning a two-to-n dimensional Hilbert space—inner product space of two or more vectors, equal to the vector inner product between two or more matrix representations of those vectors—containing $|\psi\rangle$; and
  where a collection of qubits comprises a multi-particle quantum system.

Quantum computational speedup relative to classical (non-quantum) computing/networking derives in part from invocation of quantum processing algorithms, for example, Grover's quantum factoring, Shor's quantum search, or Routt's quantum search/quantum cryptosystem algorithms.

Quantum algorithms utilize quantum circuit gates (abstract representations of quantum computation) to manipulate states of quantum systems just as classical algorithms utilize classical logical gates (represented as a sequence of Boolean gates) to perform classical (non-quantum) computational operations. Emerging quantum networks in turn, are based on quantum communication channels that transmit qubits and phase states between physically distinct quantum or hybrid quantum-classical processors able to perform quantum logic operations on qubits.

Quantum data—generated by quantum and hybrid quantum-classical computational runtime environments—yield n-dimensional probability distributions that require exponential computational resources to process, represent, store, and connect. Evolving 5G and projected 6G/Next-G mobile networks require quantum and hybrid quantum-classical communications to interconnect a plurality of emerging quantum and hybrid quantum-classical networked application resources—application programs, application programming interfaces (APIs), application servers, security servers, data repositories/lakes, routers, switches, load balancers, links—which in turn drives requirements to develop provably secure Quantum-Resistant Cryptography and Post-Quantum Cryptosystems.

Currently approved classical (non-quantum) cryptographic algorithms are reasonably secure against conventional (classical) computer-based attack vectors. For example, Advanced Encryption Standard-128 (AES) contains a 128-bit key and on average requires $2^{127}$ brute force guesses to find the correct key which would theoretically require approximately $5.4 \times 10^{24}$ years, assuming that one key is tried per microsecond ($10^{-6}$ second).

It is generally thought that doubling the key size of traditional symmetric keys and hashes will allow the symmetric keys to remain reasonably quantum-safe for the foreseeable future. However, the majority of classical (non-quantum) cryptographic algorithms considered to be quantum-resistant (i.e., lattice-based cryptography, code-based cryptography, multivariate polynomial cryptography, hash-based signatures, elliptic-curve cryptography) will likely require ever larger key sizes than the algorithms they will replace, likely necessitating change-out of a range of internet protocols including Transport Layer Security (TLS) and/or Internet Key Exchange (IKE).

Evolution from weaker to stronger classical cryptography has been generally based on a bits-of-security paradigm, where security of a given cryptographic algorithm is measured on the time-complexity of attacking it with a classical computer. For example, adding a single bit to a given classical cryptographic key size adds at most a small amount of work to encrypt and decrypt, but doubles the amount of work to break. Mathematically, encryption and decryption efforts grow linearly with key length, but the cryptanalysis effort increases exponentially.

The bits-of-security paradigm—even at larger key sizes over algebraic lattice systems—does not necessarily ensure the security of cryptographic algorithms against emergent quantum cryptanalysis performed on emergent general-purpose quantum computers. For example, a Cryptanalytically Relevant Quantum Computer (CRQC) employing Shor's algorithm could theoretically compromise longer asymmetric encryption keys within tractable (polynomial) time. While it is thought that Shor's algorithm operating on a general-purpose quantum computer could not compromise symmetric or hashing algorithms in tractable/polynomial time, emerging CRQC-resident algorithms are projected to compromise their security in tractable/polynomial time.

FIG. 2B is a table that projects the impact of a CRQC attack on representative conventional (classical, non-quantum) cryptographic algorithms. As shown in table 201, emergent CRQCs are projected to generate super exponential time-scale-based attacks against cryptographic assets that rely on generally classically intractable exponential time defense postures.

Figure 2C:
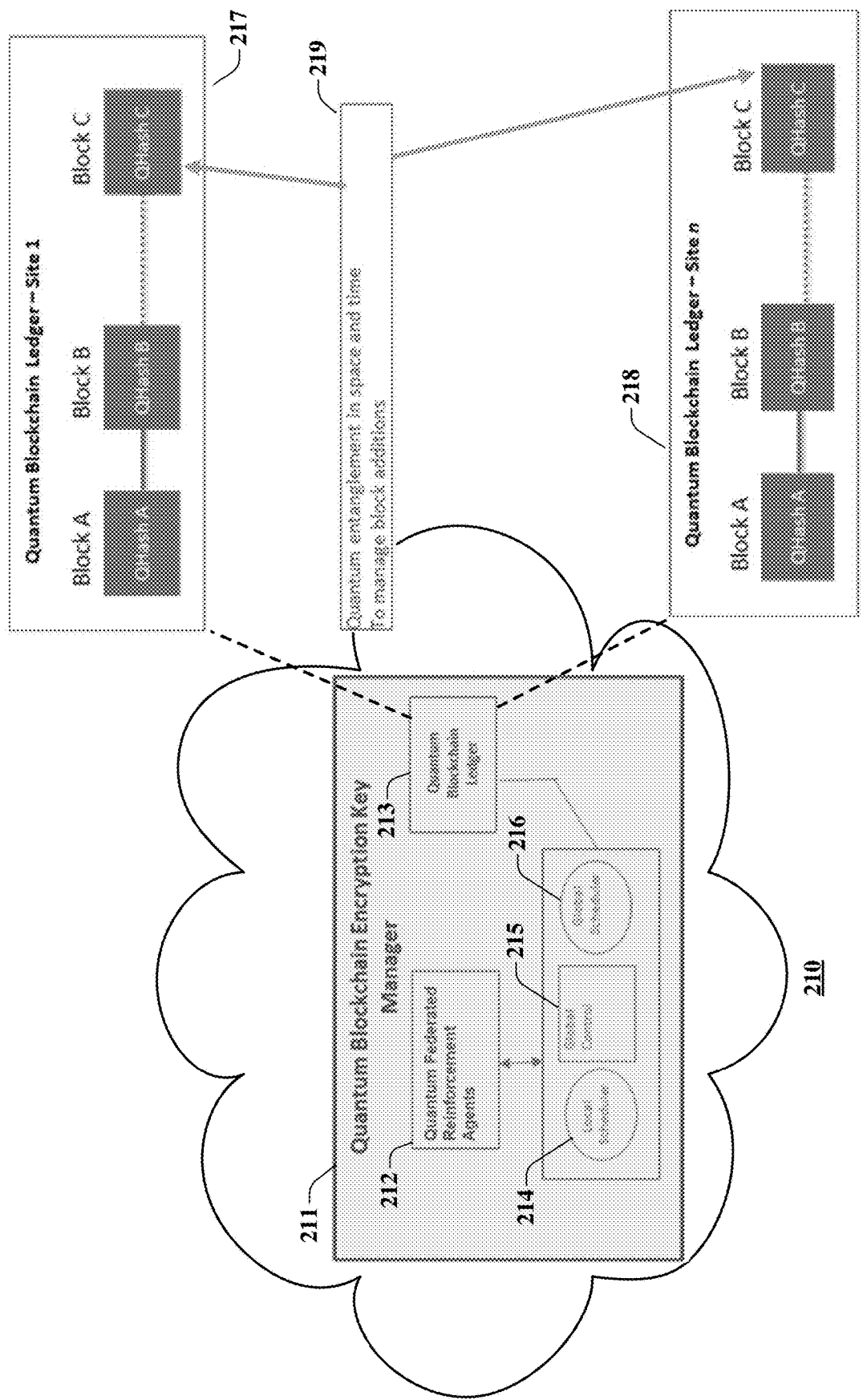
FIG. 2C is a block diagram illustrating an example, non-limiting embodiment of a system for storing encryption keys in a distributed quantum blockchain encryption key management database functioning within a hybrid quantum-classical computing and communications network in accordance with various aspects described herein.

FIG. 2C is a block diagram illustrating an example, non-limiting embodiment of a system for storing encryption keys in a distributed quantum blockchain encryption key management database functioning within a hybrid quantum-classical computing and communications network in accordance with various aspects described herein. As shown in FIG. 2C, a hybrid quantum-classical computing and communications network 210 comprises a quantum blockchain encryption key manager 211, the manager 211 comprising quantum federated reinforcement learning agents 212, a quantum blockchain ledger 213, a local scheduler 214, a global control element 215 and a global scheduler 216.

In an embodiment, quantum blockchain encryption key manager 211 is implemented in a hybrid quantum-classical computing and communications network 210 that incorporates a plurality of computing/networking sources, server-resident encryption functionality, device-resident encryption functionality, relaying nodes, communications channels, and computing/networking receivers.

In an embodiment, the hybrid quantum-classical computing and communications network 210 incorporates a plurality of terrestrial, celestial (free-space optics, microwave, near-earth, deep-space), subterranean, and sub-sea communications links. In an embodiment, the hybrid quantum-classical computing and communications network 210 incorporates heterogeneous interconnections of conventional (classical, non-quantum) devices that connect and exchange data utilizing a plurality of classical communications protocols. In an embodiment, the hybrid quantum-classical computing and communications network 210 incorporates heterogeneous interconnections of quantum devices that exchange qubits and distribute entangled states. In an embodiment, the hybrid quantum-classical computing and communications network 210 conducts quantum measurements of superposed entangled quantum states, collapsing a plurality of quantum states into post-measurement orthogonal states. In an embodiment, the hybrid quantum-classical computing and communications network 210 noise characteristics are periodically measured, collected as network fingerprints, and stored in a quantum blockchain ledger 213. A plurality of space-based and terrestrial atomic clocks would provide a means of timekeeping via quantum entanglement-based synchronization of a plurality of relative times and frequency synchronizations between and among a plurality of space- and earth-based quantum clocks, quantum gyroscopes, quantum accelerometers, and quantum positioning systems to generate and inform relative and absolute position and velocity.

Quantum federated reinforcement learning (QFRL) agents 212 model statistical fluctuations for quantum random number generators, as set forth in more detail below. QFRL agents 212 are trained on the measured network fingerprints, distinguished for example into composite network fingerprints and/or individual network element fingerprints. In an embodiment, QRFL agents 212 continuously scan network noise measurements and patterns generated therefrom to detect cryptanalytic attacks by identifying specific patterns/characteristics associated with a plurality of known attack profiles or newly detected attacks. Generation of unique attack 'fingerprints' or 'signatures' facilitate scanning through network traffic and system logs that are stored in the quantum blockchain ledger 213 to ascertain any matches to signatures of prior known attack profiles. If an attack is detected, QFRL agents 212 would isolate compromised network elements, sets of elements, and/or other network components and/or subsystems, and route traffic around compromised network elements.

Quantum blockchain ledger 213 comprises a plurality of quantum blockchains located at geographically separate sites 217, 218. Quantum entanglement 219 is used to manage blockchain additions. In an embodiment, the quantum blockchain ledger 213 stores quantum encryption keys and encryption algorithms. In an embodiment, quantum blockchain ledger 213 stores and manages a plurality of smart contracts directed to third-parties that would efficiently and transparently enact transactions. In an embodiment, a plurality of quantum-generated random number-generated encryption keys are stored by the quantum blockchain encryption key manager 211.

Local scheduler 214 is responsible for coordinating the learning process of each Quantum Reinforcement Learning agent on local devices and/or nodes of the Quantum Federated Reinforcement Learning system. The local scheduler:
  Collects data from the agent environment;
  Schedules updates to policies of the local agent;
  Adjusts the learning rate or other local agent hyperparameters based on local performance parameters; and
  Sends the computed local updates back to the Global control element for aggregation in the global model.

Global control element 215 is a centralized system that manages and orchestrates the training process across all participating Quantum Reinforcement agents on devices and/or nodes. Its primary role is to coordinate and optimize the training process across the distributed agents on devices and/or nodes while ensuring the privacy and security of the local agent data on each device and/or node. Global control element 215:

- creates an initial Quantum Reinforcement model and sends the model to distributed Quantum Reinforcement Learning agents;
- Each agent trains a local model based on their own dataset;
- Updates of model parameters are sent to the global control element;
- The global control element combines the model updates using aggregation algorithms; and
- The combined model is sent back to the distributed agents.

Global control element 215 aggregates model updates received from each device and/or node agent to create a global model that represents the collective knowledge of all local models. Agents which are created or join later can access the latest global model by communicating with the global control element.

Global scheduler 216 determines when and how each Quantum Reinforcement Learning agent participates in the learning process, based on various factors such as available resources (Quantum-Classical compute, bandwidth, memory), data quality and model performance. The global scheduler improves the efficiency of the training process by balancing the training resource load across agents on devices and/or nodes. The global scheduler is a sub-component of the global controller.

Figure 2D:
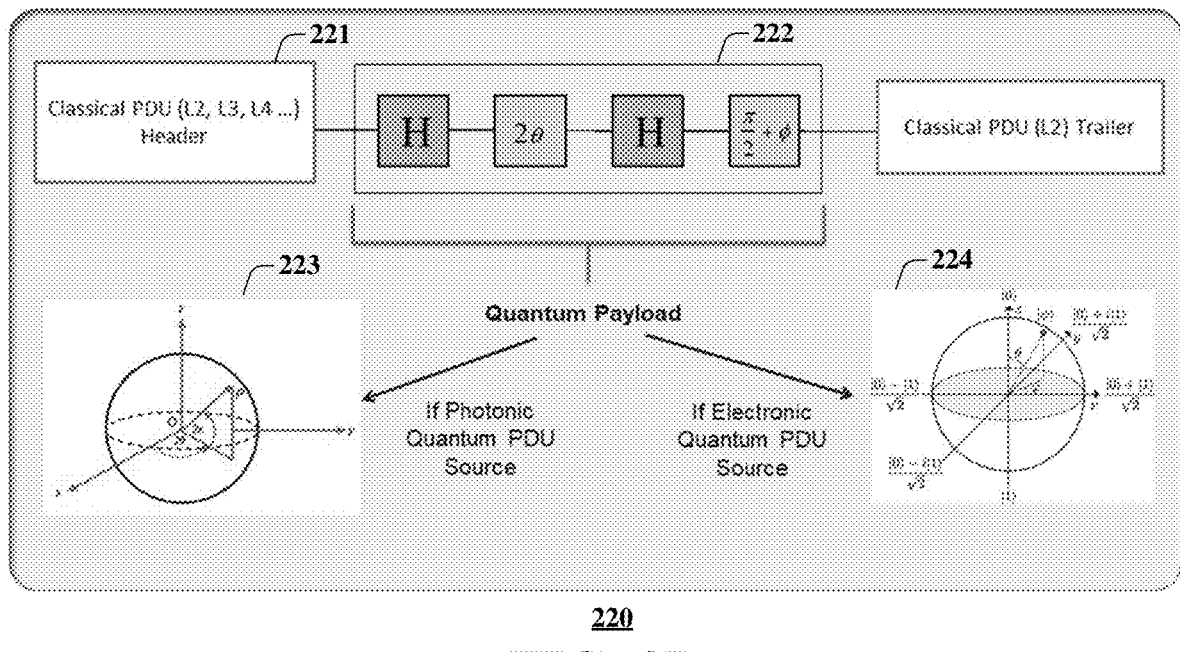
FIG. 2D is a block diagram illustrating an example, non-limiting embodiment of deep protocol data unit inspection by a quantum blockchain database manager in the system functioning within the communications network of FIG. 2C in accordance with various aspects described herein.

FIG. 2D is a block diagram illustrating an example, non-limiting embodiment of deep protocol data unit inspection by a quantum blockchain database manager in the system functioning within the communications network of FIG. 2C in accordance with various aspects described herein. In an embodiment, the quantum blockchain encryption key manager would detect a plurality of CRQC-originated attack vectors based on performing packet analysis 220 of protocol data unit (PDU) headers 221 of inbound Internet- and/or Intranet-based traffic, to determine whether PDUs identify reference to a quantum payload 222. For example, PDU headers/trailers could be classical (non-quantum), would identify quantum-based PDU payloads conveyed over quantum-classical photonic information channels (represented as a Poincaré sphere 223 in FIG. 2D) or quantum-classical electronic information channels (represented as a Bloch sphere 224 in FIG. 2D), and respective PDU headers could reflect a plurality of PDU architectural layers.

In an embodiment, a layer 2 classical (non-quantum) PDU header would contain reference to quantum PDU payloads associated with photonic or electronic internode frames.

In an embodiment, a packet-layer classical (non-quantum) PDU header would contain reference to layer 3 routing, error correction, error recovery and reference to layer 3 packet-switching via photonic or electronic quantum router networks.

In an embodiment, a layer 4 classical (non-quantum) PDU header/trailer would contain reference to quantum PDU payloads associated with logical end-to-end connection-oriented or connectionless communications infrastructures. In each of the [layer 2, 3, 4] embodiment examples, the presence of cryptanalytically relevant quantum computer-originated attack vectors would be detected, both physically and logically.

In an embodiment, the presence of a quantum payload would be detected via quantum layer 4 protocol (i.e., Q-TCP, Q-UDP) unique handshake, connection establishment, data transfer, retransmission, quantum error correction, and quantum error avoidance patterns that are distinct from classical layer 4 internet protocol exchanges and timing, stored in the quantum blockchain ledger, improving defensive postures based on AI-based reinforcement learning.

In an embodiment, encryption servers and devices incorporate a plurality of classical (non-quantum) symmetric ciphers such as for example, Advanced Encryption Standard (AES)-128, AES-192, AES-256, AES-512, AES-n. In an embodiment, encryption servers and devices would incorporate a plurality of classical (non-quantum) symmetric Secure Hash Algorithm (SHA) hash functions to create unique output results corresponding to unique content inputs, where the hash functions create unique 'digital fingerprints' of hashed content, and where a plurality of hashing functions can cryptographically sign and verify the integrity of contents, subjects, and additional cryptographic objects. In an embodiment encryption servers and devices would incorporate a plurality of SHA-based hash functions and associated extendable-output functions (EOFs), for example, SHA-3 and SHA-256 and associated EOFs. In an embodiment, encryption-resident servers and encryption-resident devices would include a plurality of classical (non-quantum) structured lattice schemes directed to general encryption where security is based on the difficulty of solving a learning with errors (LWE) problem over algebraic module lattices, where the secret can be incorporated into the same distribution as the notice, and where the LWE scheme can be constructed as a square rather than rectangular matrix. In an embodiment, encryption-resident servers and encryption-resident devices would include a plurality of classical (non-quantum) structured lattice schemes directed to digital encryption. In an embodiment, encryption-resident servers and encryption-resident devices would include a plurality of quantum conjugate encoding schemes such as for example, quantum key distribution (QKD, aka BB84, B92, EPR) utilizing quantum photonics rather than mathematical algorithms, that invoke fundamental aspects of quantum mechanics—i.e., Einstein-Podolsky-Rosen (EPR) apparent violation of Bell inequalities, uncertainty principle, unitarity to achieve quantum cryptography—and which enable storage and transmission of two messages by encoding them in pairs of conjugate observables such as linear and circular polarization of light, so that either, but not both of reference pair constituents, can be received and decoded. Logically related communications would be provably secure via use of entanglement-based QKD (ENT-QKD) utilizing one or a plurality of photon pair sources between the points where keys are generated, enabling communication of arbitrary quantum states and via use of prepare and measure QKD (PM-QKD, for example, DS-BB84).

In an embodiment, one or a plurality of classical (non-quantum) cryptographic algorithms would be updated, tracked, and distributed when required to improve cryptographic agility. In an embodiment, one or a plurality of quantum cryptographic algorithms would be updated, tracked, and distributed when required to improve cryptographic agility.

In an embodiment, a plurality of quantum random number generators (QRNGs) would be incorporated to generate symmetric cipher keys utilizing a plurality of QFRL agents that model the statistical fluctuations and determines bounds and parameters for finite QRNG output. The QFRL agents would model the statistical fluctuation of a plurality of QRNGs and determine the upper bound of parameters for Quantum Random Number Generation. The QFRL model would also adjust final randomness and apply randomness extraction to QRNG output based on QRNG demand where QRNG demand factors could include QRNG load (i.e., required rate of QRNG generation, QRNG randomness bounds related to security levels—higher security levels require longer QRNs), final key protocol model input requirements, number of QRNG generators, and other factors. QFRL global agent parameters would be stored in the quantum blockchain ledgers.

In an embodiment, the quantum state generated in a quantum encryption protocol would be based on a plurality of Qudit multi-dimensional (d>2) computational units where Qudits are multi-level computational unit alternatives to the conventional 2-level qubit, where Qudits have a higher noise resiliency and quantum bit error rate than Qubits, and where increased resistance to noise and adversarial attack vectors is proportional to Qudit higher dimensionality, for example, 3, 4, 5, 6, 7, 8, and higher Qudit dimensions.

In an embodiment, a quantum-resistant and post-quantum-safe cryptosystem would be enabled via an encryption algorithm database/inventory managed by the quantum blockchain ledgers that would for example, integrate a plurality of cryptographic algorithms based on detection of a plurality of cryptanalytically relevant quantum computer (CRQC)-originated attack vectors.

In an embodiment, the quantum blockchain encryption key manager would detect cryptanalytic attacks based on analysis of inbound patterns of input and output strings against a plurality of classical ciphers, would distinguish inbound cryptanalytic attack patterns from comparatively intractable brute force compromise attempts, and would store detected cryptanalytic attack patterns, integrate with prior detection entries.

Figure 2E:
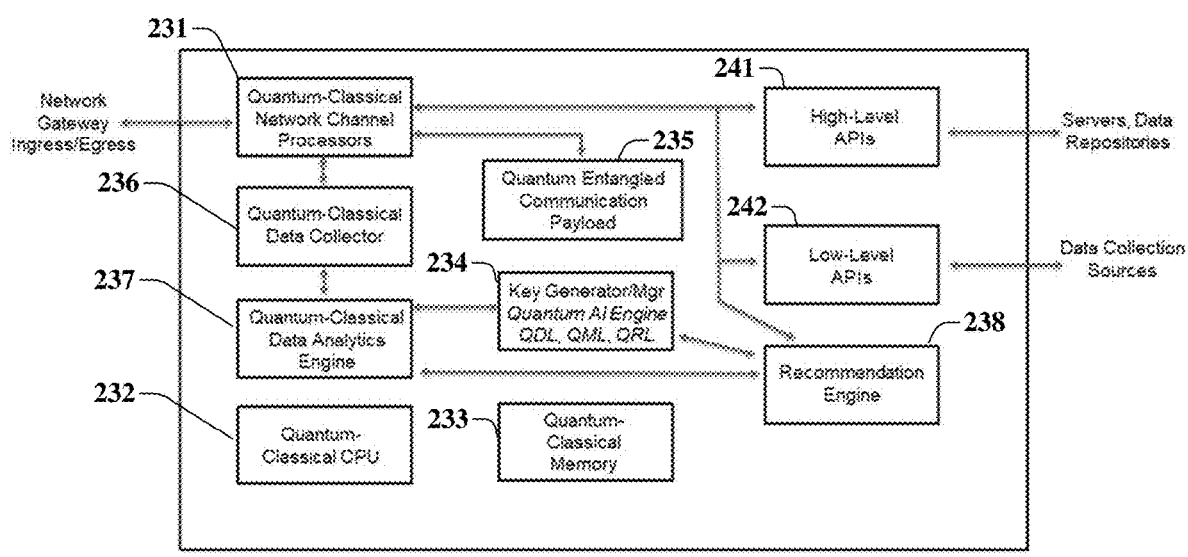
FIG. 2E is a block diagram illustrating an example, non-limiting embodiment of a quantum-safe encryption key generator/manager system functioning within the communications network of FIG. 2C in accordance with various aspects described herein.

FIG. 2E is a block diagram illustrating an example, non-limiting embodiment of a quantum-safe encryption key generator/manager system functioning within the communications network of FIG. 2C in accordance with various aspects described herein. As shown in FIG. 2E, one or a plurality of quantum artificial intelligence (QAI) elements 234 incorporating quantum deep learning (QDL), quantum machine learning (QML), and quantum reinforcement learning (QRL) components would store and access a plurality of records and "learn" from interaction with a plurality of classical and quantum encryption servers and quantum-safe encryption algorithm inventory to dynamically select from among a plurality of quantum-safe encryption algorithms to optimize provable security of protected data in transit and data at rest. The system 230 comprises a communications network between and among a plurality of assets having one or more quantum communication channels 231; a processing system including quantum processors or hybrid quantum-classical processors 232 and a memory 233 that stores executable instructions that, when executed by the processing system, facilitate the performance of operations including: transmitting and receiving qubits across the one or more quantum communication channels between and/or among the quantum and hybrid quantum-classical processors, wherein each quantum processor or hybrid quantum-classical processor is physically distinct, and wherein the one or more quantum communications channels utilize quantum channel encoding and quantum error detection; performing quantum logic operations on the qubits; and utilizing a plurality of end-to-end quantum and hybrid quantum-classical networked application resources to implement QAI and/or QML functions.

The system 230 also comprises a quantum-entangled communication payload 235 that enables distributed entanglement between/among a plurality of resources including for example, two-qubit Bell pair cluster states to enable distributed, measurement-based quantum computation, quantum key distribution (QKD), Quantum state teleportation, Superdense coding (the latter, enabling communication of two classical bits of information via transmission of a single qubit, effectively doubling classical channel capacity), Greenberger-Horne-Zeilinger (GHZ) states to enable multi-party quantum hub communications, and which includes interfaces to Quantum-Classical network channel processors 231.

The system 230 also comprises a quantum-classical data collector 236 that may be used, for example, to capture relevant data traffic between and among a plurality of entities utilizing mobile and non-mobile applications and as such, may provide a central point of event-driven and/or query-driven data acquisition and delivery methodologies.

The system 230 also comprises a quantum-classical data analytics engine 237 that generates for example, actionable descriptive analytics, diagnostic analytics, predictive analytics, and/or prescriptive analytics directed to optimizing capture and identification/recognition of a plurality of inbound/ingress classical information payloads, quantum information payloads that originate from general-purpose quantum-classical computational sources, and cryptanalytically relevant quantum computer (CRQC) sources.

The system 230 also comprises a recommendation engine 238 that operates on input from the quantum-classical data analytics engine 237, high-level APIs 241, low-level APIs 242, and Quantum AI Engine 234, and issues requests to the Key Generator/Manager 234 to store and access a plurality of records and "learn" from interaction with a plurality of classical and quantum encryption servers and quantum-safe encryption algorithm inventory to dynamically select from among a plurality of quantum-safe encryption algorithms to optimize provable security of protected data in transit and data at rest, in direct response to detected immediate and/or anticipated cryptographic threats, and/or in direct response to detected cryptanalytically relevant quantum computer (CRQC)-originated attack vectors.

Figure 2F:
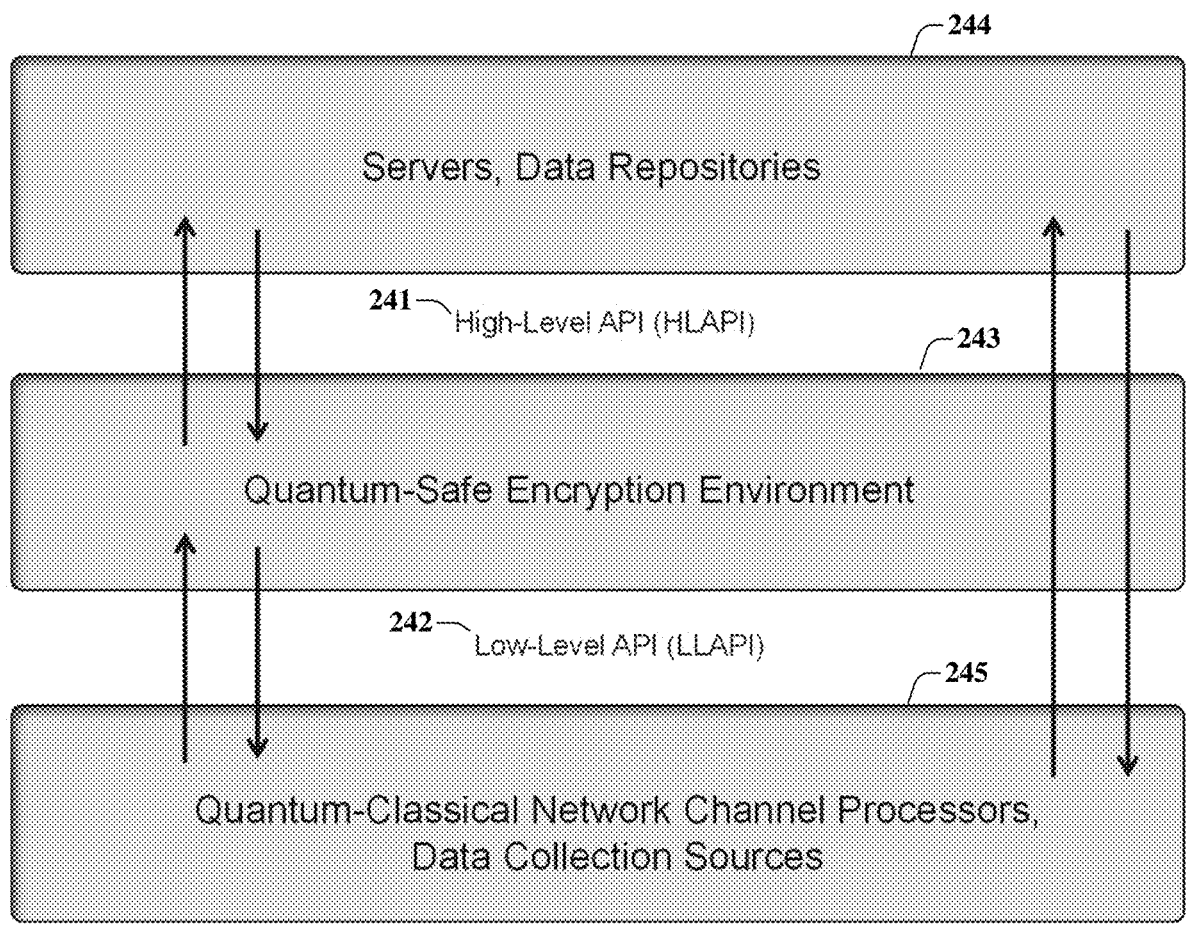
FIG. 2F is a block diagram illustrating an example, non-limiting embodiment of an exemplary functional description of high-level application programming interfaces and low-level application programming interfaces associated with a quantum-safe encryption algorithm system operating within a hybrid quantum-classical computational and network processing environment.

High-level application programming interfaces (HLAPIs) 241 and low-level APIs (LLAPIs) 242 are associated with a Quantum-Safe encryption algorithm system illustrated in FIG. 2F.

FIG. 2F is a block diagram illustrating an example, non-limiting embodiment of an exemplary functional description of high-level application programming interfaces (HLAPIs) and low-level APIs (LLAPIs) associated with a quantum-safe encryption algorithm system operating within a hybrid quantum-classical computational and network processing environment. As shown in FIG. 2F, scheme 240 includes HLAPIs 241 and LLAPIs 242 that provide a quantum-safe encryption environment 243 with direct access to encryption servers and data repositories 244, and data collection sources 245, as well as network gateway ingress/egress via quantum-classical network channel processors. The HLAPI 241 and LLAPI 242 environment further provides a plurality of structured protocol boundaries across which Quantum, Classical, and/or Quantum-Classical network and networked applications exchange PDUs and data.

Figure 2G:
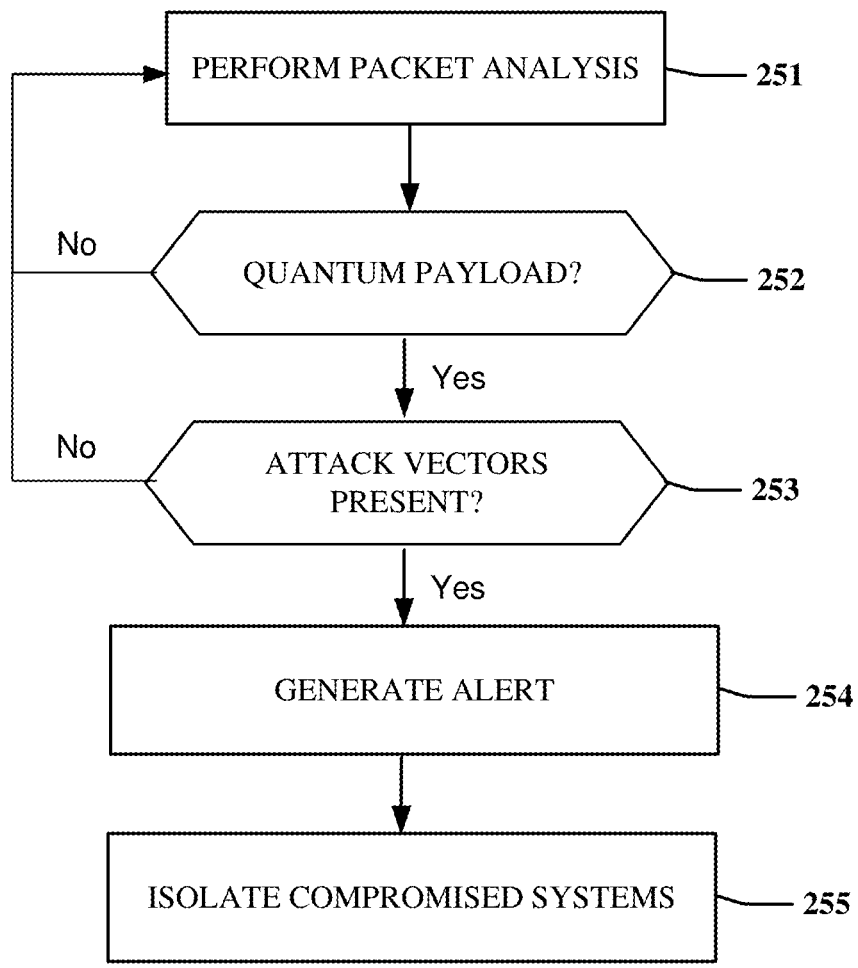
FIG. 2G depicts an illustrative embodiment of a method in accordance with various aspects described herein.

FIG. 2G depicts an illustrative embodiment of a method in accordance with various aspects described herein. As shown in FIG. 2G, method 250 begins at step 251 where a system performs a packet analysis of protocol data unit (PDU) headers of inbound Internet and/or non-Internet traffic. In an embodiment, the packet analysis comprises a deep packet inspection through many layers embedded in the data packet. Next in step 252, the system determines whether the PDU headers identify the presence of a quantum payload. If not, the process continues back at step 251. However, if a quantum payload is determined to be present, then in step 253, the system determines whether the quantum payload includes attack vectors. The cryptanalytically relevant attack vectors would likely originate from a quantum computer, and this information would aid with the detection. If no attack vectors are found, the process continues at step 251. However, if there are attack vectors, then in step 254 the system generates an alert responsive to detecting the presence of the attack vectors, followed by step 255 in which quantum federated reinforcement learning agents isolate compromised network elements, sets of elements, and/or other network components and/or subsystems, and route traffic around the compromised network elements, sets of elements, and/or other network components and/or subsystems.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 100, the subsystems and functions of systems 210 and 230 and method 250 presented in FIGS. 1, 2A, 2B, 2C, 2D, 2E, 2F, 2G and 3. For example, virtualized communication network 300 can facilitate in whole or in part determining whether protocol data unit (PDU) headers received from Internet and/or non-Internet traffic and/or via deep packet inspection detect the presence of a quantum payload; detecting a presence of attack vectors in the quantum payload responsive to a determination that the PDU headers detect the presence of the quantum payload; and generating an alert responsive to detecting the presence of the attack vectors, and isolating compromised network elements, sets of elements, and/or other network components and/or subsystems, and route traffic around the compromised network elements, sets of elements, and/or other network components and/or subsystems.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third party locations.

Figure 4:
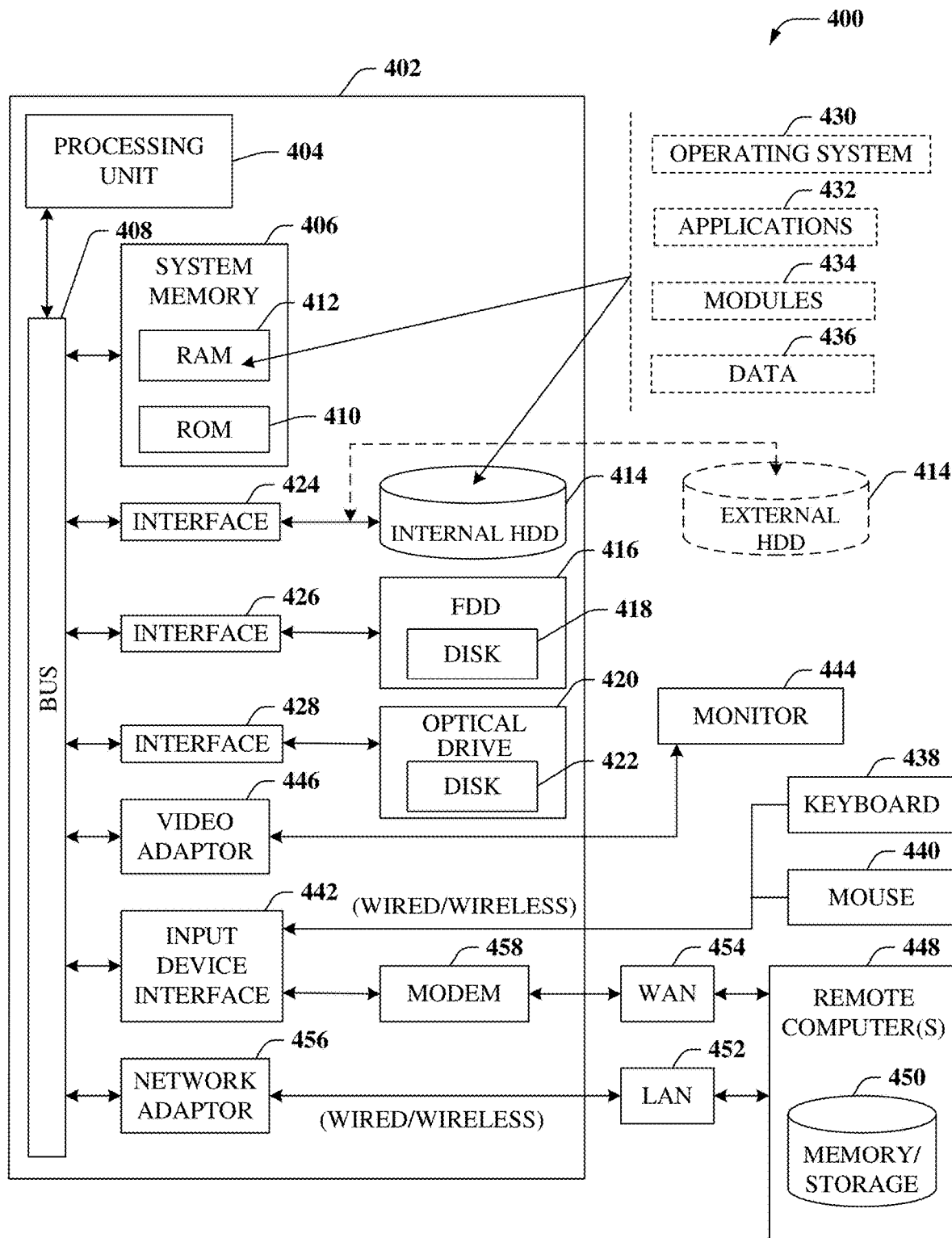
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining whether protocol data unit (PDU) headers received from Internet and/or non-Internet traffic contain reference to a quantum payload; detecting a presence of attack vectors in the quantum payload responsive to a determination that the PDU headers contain reference to the quantum payload and/or via deep packet inspection; generating an alert responsive to detecting the presence of the attack vectors; and isolating compromised network elements, sets of elements, and/or other network components and/or subsystems, and route traffic around the compromised network elements, sets of elements, and/or other network components and/or subsystems.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
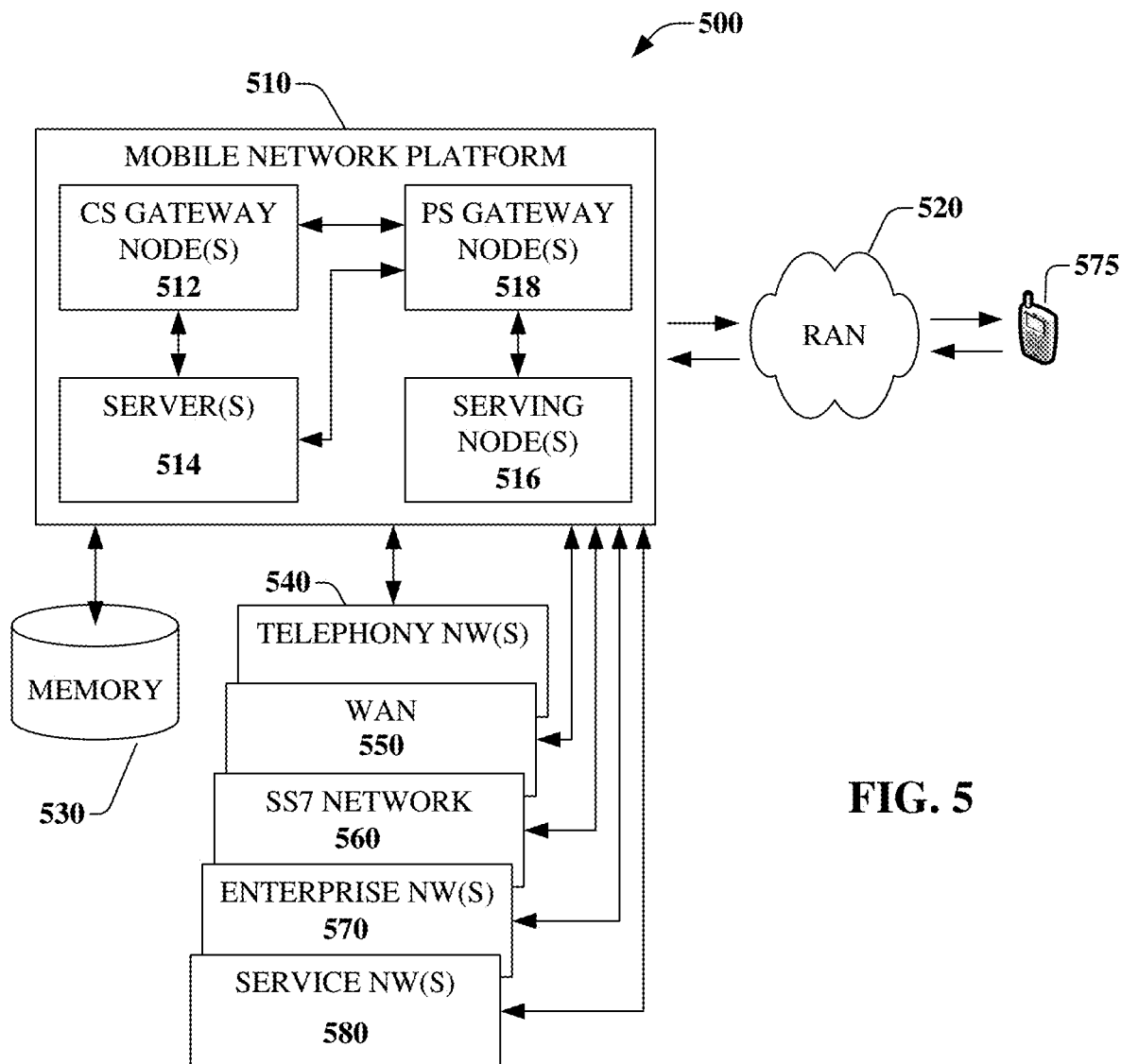
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining whether protocol data unit (PDU) headers received from Internet and/or non-Internet traffic identify the presence of a quantum payload; detecting a presence of attack vectors in the quantum payload responsive to a determination that the PDU headers identify the presence of the quantum payload and/or via deep packet inspection; generating an alert responsive to detecting the presence of the attack vectors; and isolating compromised network elements, sets of elements, and/or other network components and/or subsystems, and route traffic around the compromised network elements, sets of elements, and/or other network components and/or subsystems. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
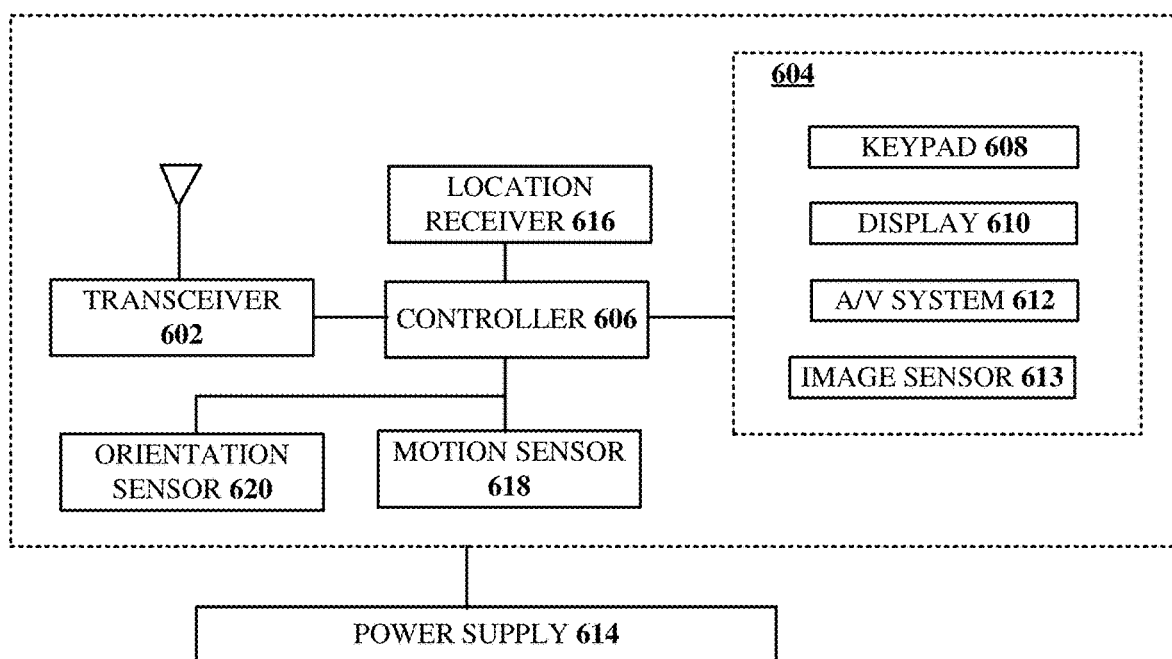
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining whether protocol data unit (PDU) headers received from Internet traffic comprise a quantum payload; detecting a presence of attack vectors in the quantum payload responsive to a determination that the PDU headers identifying the presence of a quantum payload and/or via deep packet inspection; generating an alert responsive to detecting the presence of the attack vectors; and isolating compromised network elements, sets of elements, and/or other network components and/or subsystems, and route traffic around the compromised network elements, sets of elements, and/or other network components and/or subsystems.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
performing a packet analysis of protocol data unit (PDU) headers of inbound Internet and non-Internet traffic;
determining whether the PDU headers identify a presence of a quantum payload;
detecting a presence of attack vectors in the quantum payload responsive to a determination that the PDU headers identify the presence of the quantum payload and/or via deep packet inspection, wherein the attack vectors originate from a quantum computer, and wherein the attack vectors are cryptanalytically relevant;
generating an alert responsive to detecting the presence of the attack vectors; and
isolating compromised network elements, sets of elements, and/or other network components and/or subsystems, and route traffic around the compromised network elements, sets of elements, and/or other network components and/or subsystems.

2. The device of claim 1, wherein the processing system comprises quantum processors.

3. The device of claim 1, wherein the inbound Internet and non-Internet traffic is conveyed over quantum-classical photonic information channels.

4. The device of claim 1, wherein the inbound Internet and non-Internet traffic is conveyed over quantum-classical electronic information channels.

5. The device of claim 1, wherein the PDU headers reflect a plurality of PDU architectural layers.

6. The device of claim 5, wherein the determining further comprises one or more of handshake, connection establishment, data transfer, retransmission, quantum error correction, and quantum error avoidance patterns that are distinct from classical layer internet and non-internet protocol exchanges and timing.

7. The device of claim 6, wherein the detecting further comprises artificial intelligence reinforcement learning of attack vectors.

8. The device of claim 7, wherein the operations further comprise storing the attack vectors detected in a quantum blockchain ledger.

9. A machine-readable medium, comprising executable instructions that, when executed by a processing system including a processor, facilitate performance of operations, the operations comprising:
determining whether protocol data unit (PDU) headers received from Internet and non-Internet traffic identify a presence of a quantum payload;
detecting a presence of attack vectors in the quantum payload responsive to a determination that the PDU headers identify the presence of the quantum payload and/or via deep packet inspection, wherein the attack vectors originate from a quantum computer, and wherein the attack vectors are cryptanalytically relevant;
generating an alert responsive to detecting the presence of the attack vectors; and
isolating compromised network elements, sets of elements, and/or other network components and/or subsystems, and route traffic around the compromised network elements, sets of elements, and/or other network components and/or subsystems.

10. The machine-readable medium of claim 9, wherein the processing system comprises a plurality of processors operating in a distributed computing environment.

11. The machine-readable medium of claim 10, wherein the processing system comprises quantum processors.

12. The machine-readable medium of claim 9, wherein the Internet and non-Internet traffic is conveyed over quantum-classical photonic information channels.

13. The machine-readable medium of claim 9, wherein the Internet and non-Internet traffic is conveyed over quantum-classical electronic information channels.

14. The machine-readable medium of claim 9, wherein the PDU headers reflect a plurality of PDU architectural layers.

15. The machine-readable medium of claim 14, wherein the determining further comprises identifying patterns, wherein the patterns are one or more of handshake, connection establishment, data transfer, retransmission, quantum error correction, and quantum error avoidance.

16. The machine-readable medium of claim 15, wherein the patterns are distinct from classical layer internet and non-internet protocol exchanges and timing.

17. The machine-readable medium of claim 16, wherein the detecting further comprises artificial intelligence reinforcement learning of attack vectors.

18. The machine-readable medium of claim 17, wherein the operations further comprise storing the attack vectors detected in a quantum blockchain ledger.

19. A method, comprising:
receiving, by a processing system including a processor, Internet and non-Internet traffic;

determining, by the processing system, whether protocol data unit (PDU) headers of packets in the Internet and non-Internet traffic identify a presence of a quantum payload, wherein the determining performs a packet analysis of the packets;

detecting, by the processing system, a presence of attack vectors in the quantum payload responsive to a determination that the PDU headers identify the presence of the quantum payload and/or via deep packet inspection, wherein the attack vectors originate from a quantum computer and are cryptanalytically relevant, wherein the attack vectors comprise patterns, and wherein the patterns are one or more of handshake, connection establishment, data transfer, retransmission, quantum error correction, and quantum error avoidance;

reporting, by the processing system, an alert responsive to detecting the presence of the attack vectors; and isolating compromised network elements, sets of elements, and/or other network components and/or subsystems, and route traffic around the compromised network elements, sets of elements, and/or other network components and/or subsystems.

20. The method of claim 19, wherein the processing system uses artificial intelligence reinforcement to detect unique attack signatures; and wherein quantum federal reinforcement learning agents, responsive to detecting an attack, isolate compromised network elements, sets of elements, and/or other network components and/or subsystems, and route the traffic around the compromised network elements, sets of elements, and/or other network components and/or subsystems.

* * * * *